United States Patent
Lee et al.

(10) Patent No.: US 7,702,814 B2
(45) Date of Patent: Apr. 20, 2010

(54) SYSTEM AND METHOD FOR DOWNLOADING HYPERTEXT MARKUP LANGUAGE FORMATTED WEB PAGES

(75) Inventors: Chung-I Lee, Taipei Hsien (TW);
Chien-Fa Yeh, Taipei Hsien (TW);
Chiu-Hua Lu, Taipei Hsien (TW);
Zhi-Qiang Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 354 days.

(21) Appl. No.: 11/756,593

(22) Filed: May 31, 2007

(65) Prior Publication Data
US 2008/0046449 A1    Feb. 21, 2008

(30) Foreign Application Priority Data
Aug. 18, 2006    (CN) .......................... 2006 1 0062196

(51) Int. Cl.
*G06F 15/16* (2006.01)
(52) U.S. Cl. .................. 709/246; 709/227; 709/236
(58) Field of Classification Search ............. 709/246
See application file for complete search history.

(56) References Cited

U.S. PATENT DOCUMENTS

| 2006/0212584 A1* | 9/2006 | Yu et al. ............. 709/227 |
| 2008/0071922 A1* | 3/2008 | Chetuparambil et al. ... 709/236 |
| 2009/0094332 A1* | 4/2009 | Schemers et al. ........ 709/206 |

FOREIGN PATENT DOCUMENTS

| CN | 1356644 A | 8/2002 |
| CN | 1368691 A | 9/2002 |

* cited by examiner

*Primary Examiner*—Benjamin R Bruckart
*Assistant Examiner*—Shripal K Khajuria
(74) *Attorney, Agent, or Firm*—Wei Te Chung

(57) ABSTRACT

A method for downloading HTML formatted Web pages is provided. The method includes the steps of writing a URL of a Web page to be downloaded to an XQuery script; analyzing the XQuery script to obtain the URL of the HTML Web page and saving the downloaded Web page in a database as the local Web page; analyzing the contents of the local Web page to obtain target contents; converting the relative URLs of all image files to the absolute URLs; downloading all the image files according to the absolute URLs; replacing the absolute URLs of the image files with an local image file path; converting the relative URLs of the embedded links to the absolute URLs of the embedded links; saving all the converted absolute URLs in the database, creating identifiers; replacing the converted absolute URLs of the embedded links with an embedded link local path. A related system is also disclosed.

8 Claims, 3 Drawing Sheets

SYSTEM AND METHOD FOR DOWNLOADING HYPERTEXT MARKUP LANGUAGE FORMATTED WEB PAGES

BACKGROUND OF THE INVENTION

1. Field of the Invention

The present invention relates to a system and method for downloading Hypertext Markup Language formatted Web pages.

2. Description of Related Art

Generally speaking, when a computer connects to the Internet, a traditional Web page browser in the computer needs to first download data of a Web page from a Web server before the Web browser can display the Web page. The Web page contains contents, such as image files, texts, embedded links, and advertisements. However, if a computer is not connected to the Internet, users are unable to use the computer to browse the Web page, causing users much inconvenience.

What is needed, therefore, is a system for downloading Hypertext Markup Language formatted Web pages, the system that can download Hypertext Markup Language formatted Web pages to a local Web server and display the Web page from the local Web server.

Similarly, what is also needed is a method for downloading Hypertext Markup Language formatted Web pages, the method that is used for downloading Hypertext Markup Language formatted Web pages to a local Web server and display the Web page from the local Web server.

SUMMARY OF THE INVENTION

A system for downloading Hypertext Markup Language formatted Web pages is provided. The system includes an application server, a local server coupled to the application server, a Web server electronically connected with the application server via a network and a database. The application server includes a writing module for extracting a Uniform Resource Locator (URL) of the HTML formatted Web page to be downloaded and writing the URL extracted to an XQuery script document; an analyzing module for analyzing the XQuery script document to obtain the URL of the HTML Web page to be downloaded via the Web server, saving the downloaded HTML Web page in the database as the local Web page, and for analyzing the contents of the local Web page to identify target contents by invoking the XQuery script document; a converting module for extracting the relative URLs of all image files of the target contents of the local Web page and converting the relative URLs of all image files to absolute URLs of the image files, and for extracting all relative URLs of source of the embedded links of the target contents of the local Web page and converting the relative URLs of source of the embedded links to absolute URLs of the source of the embedded links; a downloading module for downloading all the image files of the target contents via the Web server according to the absolute URLs, and saving the image files in an local image file path of the local server; a saving module for saving all the converted absolute URLs of the source of the embedded links in the database, creating an identifier for each the converted absolute URL, and saving all the identifiers in the database; a replacing module for replacing the absolute URLs of the image files of the local Web page with the local image file path, and for writing all the identifiers and the Java Server Pages (JSP) language into an embedded link local path in the local server of the source of the embedded links, and replacing the converted absolute URLs of the source of the embedded links with the embedded link local path.

Another preferred embodiment provides a method for downloading Hypertext Markup Language formatted Web pages. The method includes the steps of writing a Uniform Resource Locator (URL) of the HTML formatted Web page to be downloaded to an XQuery script document; analyzing the XQuery script document to obtain the URL of the HTML Web page to be downloaded via Web server, and saving the downloaded HTML Web page in a database as the local Web page; analyzing the contents of the local Web page to identify the target contents by invoking the XQuery script document; extracting the relative URLs of all the image files of the target contents of the local Web page and converting the relative URLs of all the image files to the absolute URLs of the image files; downloading all the image files of the target contents via the Web server according to the absolute URLs, and saving the image files in the local image file path of a local server; replacing the absolute URLs of the image files of the local Web page with the local image file path; extracting all the relative URLs of the source of the embedded links of the target contents of the local Web page and converting the relative URLs of the source of the embedded links to absolute URLs of the source of the embedded links; saving the converted absolute URLs of the source of the embedded links in the database, creating an identifier for each the converted absolute URL, and saving all the identifiers in the database; writing all the identifiers and the Java Server Pages (JSP) language into an embedded link local path in the local server of the source of the embedded links, and replacing the converted absolute URLs of the source of the embedded links with the embedded link local path.

Other advantages and novel features of the present invention will become more apparent from the following detailed description of preferred embodiment when taken in conjunction with the accompanying drawings, in which:

DETAILED DESCRIPTION OF THE INVENTION

Figure 1:
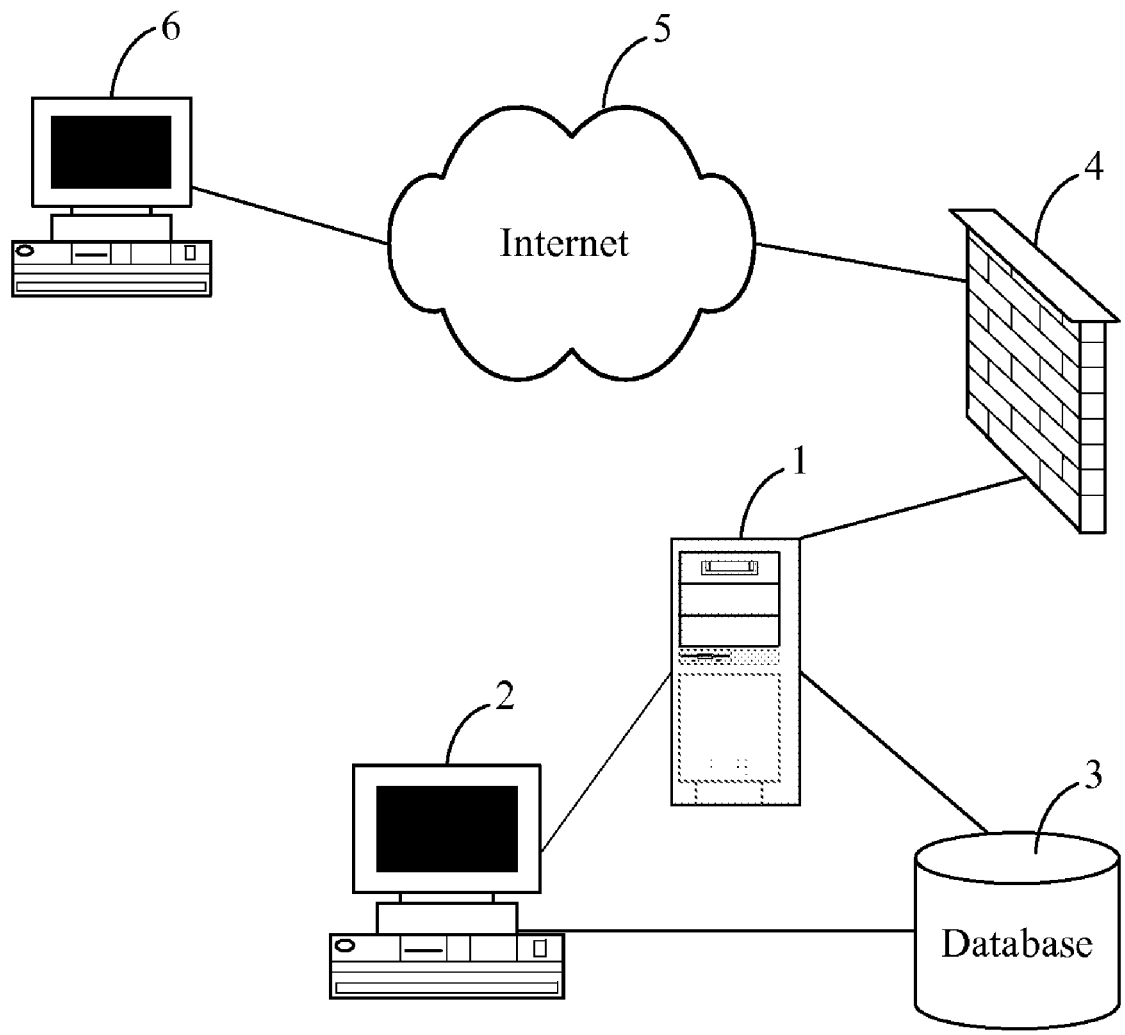
FIG. 1 is a schematic diagram of hardware configuration of a system for downloading Hypertext Markup Language formatted Web pages in accordance with a preferred embodiment.

FIG. 1 is a schematic diagram of hardware configuration of a system for downloading Hypertext Markup Language formatted Web pages (hereinafter, "the system") in accordance with a preferred embodiment of the present invention. The system typically includes an application server 1, a local server 2, a database 3, a firewall 4, a connection to the Internet 5, and a Web server 6. The application server 1 is used for downloading Web pages via the Web server 6 from the Internet 5 as a local Web page (mirror Web page) on the local server 2, and for processing downloaded Web pages so as to have the local Web page working. The local server 2 is connected with the application server 1, and saves image files of the downloaded Web pages. The database 3 connects with the application server 1 and the local server 2, and copies contents of the downloaded Web pages to the local Web pages. The firewall 4 is configured between the application server 1 and the Web server 6, and is used for managing Internet security.

Figure 2:
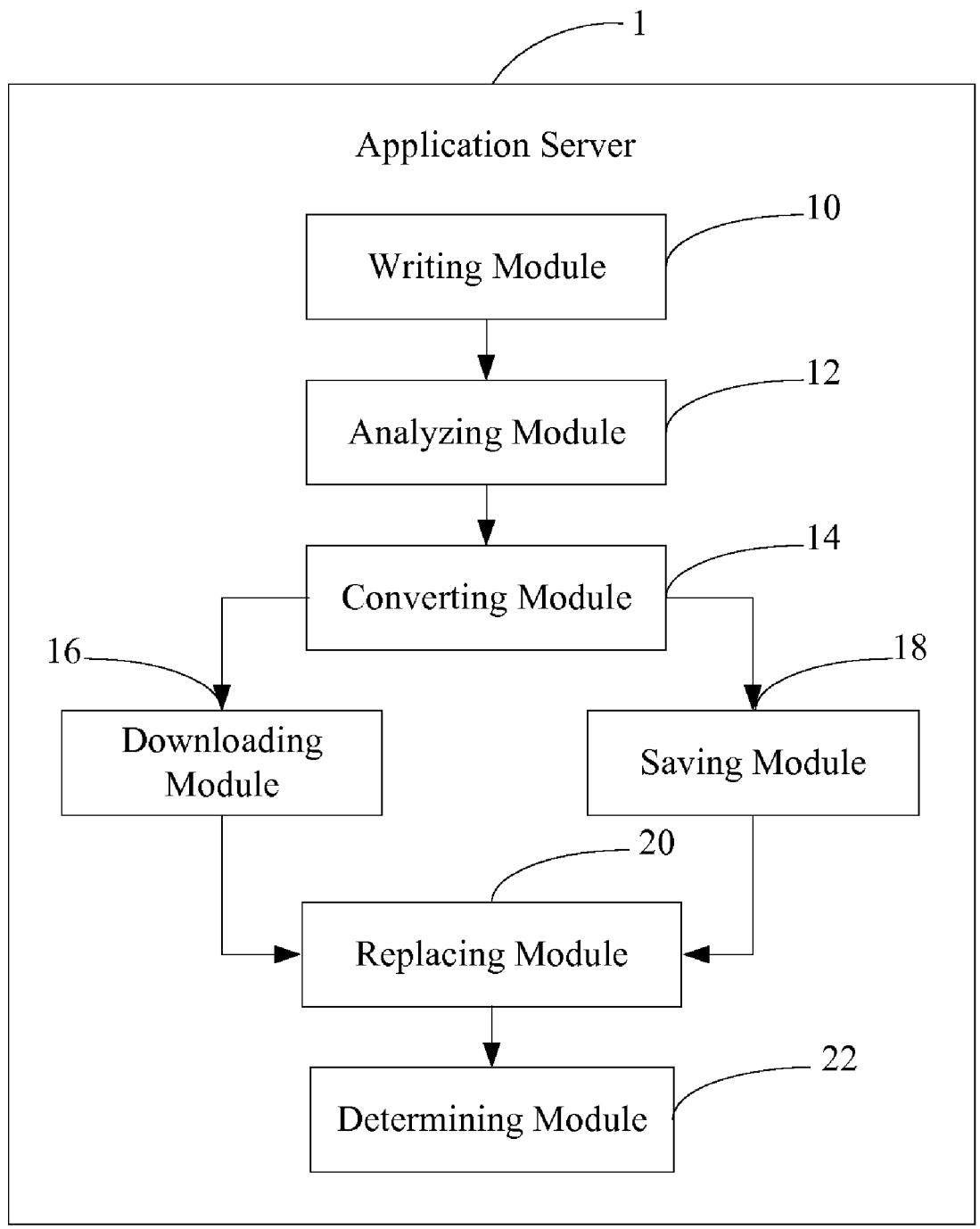
FIG. 2 is a schematic diagram of main function unit of an application server of FIG. 1.

FIG. 2 is a schematic diagram of main function units of the application server 1. The application server 1 typically includes a writing module 10, an analyzing module 12, a converting module 14, a downloading 16, a saving module 18, a replacing module 20, and a determining module 22.

The writing module 10 is configured for extracting a Uniform Resource Locator (URL) of the HTML formatted Web page to be downloaded and writing the URL extracted to the XQuery script document.

The analyzing module 12 is programmed for analyzing the XQuery script document to obtain the URL of the HTML Web page to be downloaded via the Web server 6, and for saving the downloaded HTML Web page in the database 3 as the local Web page. The local Web page may be converted from the HTML format to the Extensible Markup Language (XML) format. The analyzing module 12 is also programmed for analyzing the contents of the local Web page to identify target contents by invoking the XQuery script document. The local Web page may include image files, texts, and embedded links.

The converting module 14 is programmed for extracting relative URLs of all image files of the target contents of the local Web page and converting relative URLs image files to absolute URLs of the image files. The converting module 14 is also programmed for extracting all relative URLs of the source of the embedded links of the local Web page and converting the relative URLs to absolute URLs of the source of the embedded links. Each of the absolute URLs includes a protocol, such as "http", a network location, an optional path, and a file name, while a relative URL is a compact representation of the location of a resource relative to the absolute URL. For example, "flash/swfl/1089246822_zhenzj.swf" is the relative URL; and "http://www.flashempire.com/flash/swfl/1089246822_zhenzj.swf" is the absolute URL.

The downloading module 16 is programmed for downloading all the image files of the target contents via the Web server 6 according to the absolute URLs, and saving the image files in a local image file path of the local server 2.

The saving module 18 is programmed for saving all the converted absolute URLs of the source of the embedded links in the database 3, creating an identifier for each the converted absolute URL, and saving all the identifiers in the database 3. The saving module 18 is also programmed for saving all the target contents to the database 3.

The replacing module 20 is programmed for replacing the absolute URLs of the image files of the local Web page with the local image file path. The replacing module 20 is also programmed for writing the identifiers and the Java Server Pages (JSP) language into an embedded link local path in the local server of the source of the embedded links, and replacing the converted absolute URLs of the source of the embedded links with the embedded link local path.

The determining module 22 is programmed for determining whether contents of the URL in the replaced absolute URLs of the source of the embedded links need to be downloaded.

Figure 3:
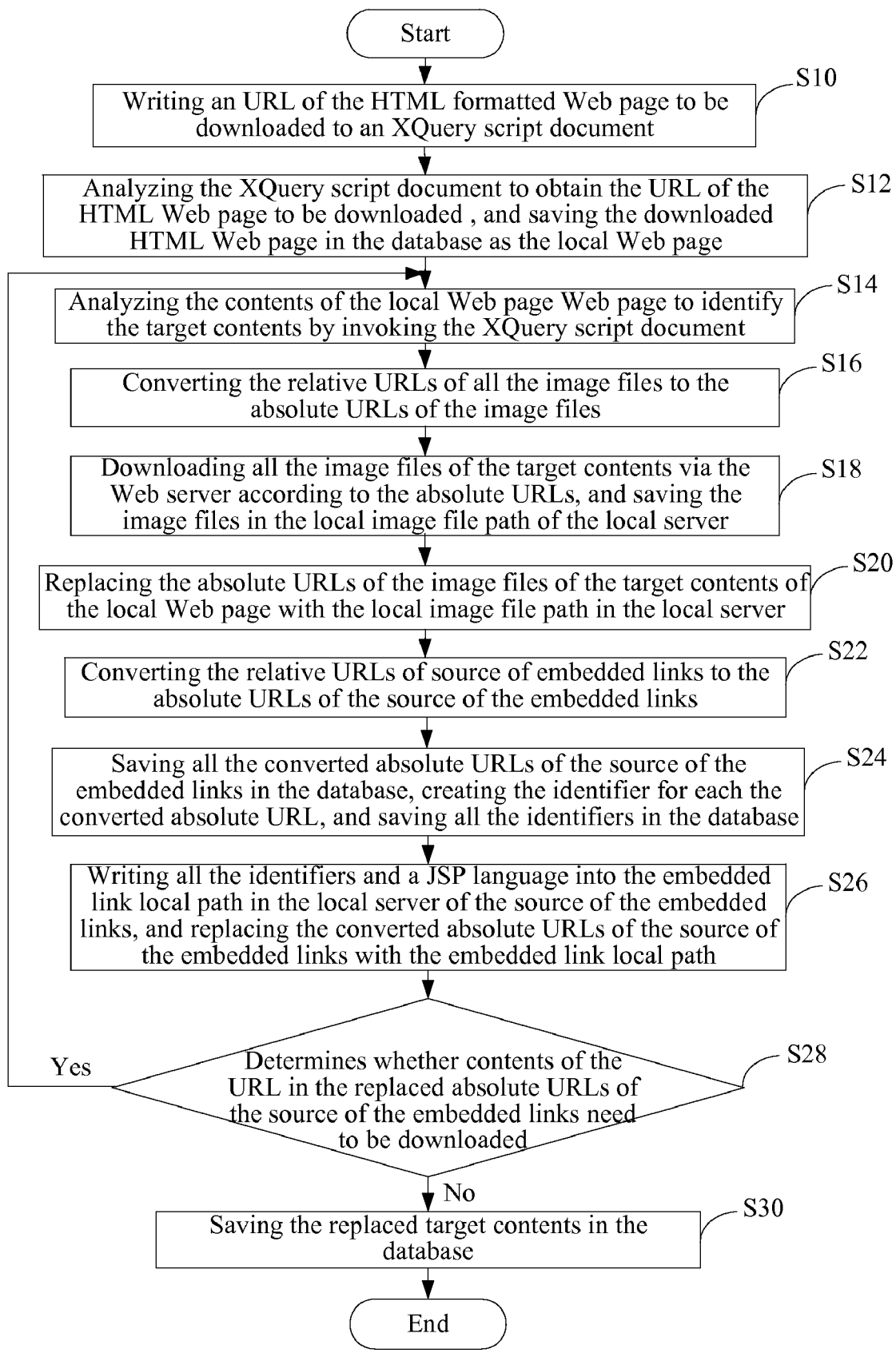
FIG. 3 is a flowchart of a preferred method for downloading Hypertext Markup Language formatted Web pages in accordance with a preferred embodiment.

FIG. 3 is a flowchart of a preferred method for downloading Hypertext Markup Language (HTML) formatted Web pages in accordance with a preferred embodiment. In step S10, the writing module 10 writes the Uniform Resource Locator (URL) of the HTML formatted Web page to be downloaded to the XQuery script document.

In step 12, the analyzing module 12 analyzes the XQuery script document to obtain the URL of the HTML Web page to be downloaded via the Web server 6, and saves the downloaded HTML Web page in the database 3 as the local Web page. The local Web page may be converted from the HTML format to the Extensible Markup Language (XML) format.

In step S14, the analyzing module 12 analyzes the contents of the local Web page Web page to identify the target contents by invoking the XQuery script document.

In step S16, the converting module 14 extracts the relative URLs of all the image files of the target contents of the local Web page and converts the relative URLs of all the image files to the absolute URLs of the image files.

In step S18, the downloading module 16 downloads all the image files of the target contents via the Web server according to the absolute URLs, and saves the image files in the local image file path of the local server 2.

In step S20, the replacing module 20 replaces the absolute URLs of the image files of the target contents of the local Web page with the local image file path in the local server 2.

In step S22, the converting module 14 extracts all the relative URLs of the source of the embedded links of the local Web page and converts the relative URLs of source of the embedded links to the absolute URLs of the source of the embedded links.

In step S24, the saving module 18 saves all the converted absolute URLs of the source of the embedded links in the database 3, creates the identifier for each the converted absolute URL, and saves all the identifiers in the database 3.

In step S26, the replacing module 20 writes all the identifiers and the Java Server Pages (JSP) language into the embedded link local path in the local server of the source of the embedded links, and replaces the converted absolute URLs of the source of the embedded links with the embedded link local path.

In step S28, the determining module 22 determines whether contents of the URL in the replaced absolute URLs of the source of the embedded links need to be downloaded.

If no contents need to be downloaded, in step S30, the saving module 18 saves the replaced target contents in the database 3, and the procedure is ended.

Otherwise, if any contents need to be downloaded, the procedure returns to step S14.

Although the present invention has been specifically described on the basis of a preferred embodiment and a preferred method, the invention is not to be construed as being limited thereto. Various converts or modifications may be made to said embodiment and method without departing from the scope and spirit of the invention.

What is claimed is:

1. A computing system for downloading Hypertext Markup Language (HTML) formatted Web pages, the computing system comprising:
   an application server;
   a local server coupled to the application server;
   a Web server electronically connected to the application server via a network and a database;
   the application server comprising:
   a writing module for extracting a Uniform Resource Locator (URL) of the HTML formatted Web page to be downloaded and writing the extracted URL to an XQuery script document;
   an analyzing module for analyzing the XQuery script document to obtain the URL of the HTML Web page to be downloaded via the Web server, saving downloaded HTML Web page in the database as a local Web page, and for analyzing the contents of the local Web page to identify target contents by invoking the XQuery script document;

a converting module for extracting the relative URLs of all image files of the target contents of the local Web page and converting the relative URLs of all image files to absolute URLs of the image files, and for extracting all relative URLs of source of embedded links of the target contents of the local Web page and converting the relative URLs of source of the embedded links to absolute URLs of the source of the embedded links;

a downloading module for downloading all the image files of the target contents via the Web server according to the absolute URLs, and saving the image files in an local image file path of the local server;

a saving module for saving all the converted absolute URLs of the source of the embedded links in the database, creating an identifier for each the converted absolute URL, and saving all the identifiers in the database; and a replacing module for replacing the absolute URLs of the image files of the local Web page with the local image file path, and for writing all the identifiers and the Java Server Pages (JSP) language into an embedded link local path in the local server of the source of the embedded links, and replacing the converted absolute URLs of the source of the embedded links with the embedded link local path.

2. The system as claimed in claim 1, wherein the application server further comprises:
a determining module for determining whether contents of the URL in the replaced absolute URLs of the source of the embedded links need to be downloaded.

3. The system as claimed in claim 1, wherein the saving module is further programmed for saving the replaced target contents in the database.

4. A computer-based method for downloading Hypertext Markup Language (HTML) formatted Web pages, the method being performed by an application server, the method comprising the steps of:

writing a Uniform Resource Locator (URL) of the HTML formatted Web page to be downloaded to an XQuery script document;

analyzing the XQuery script document to obtain the URL of the HTML Web page to be downloaded via a Web server, and saving downloaded HTML Web page in a database as a local Web page;

analyzing the contents of the local Web page to identify the target contents by invoking the XQuery script document;

extracting the relative URLs of all the image files of the target contents of the local Web page and converting the relative URLs of all the image files to the absolute URLs of the image files;

downloading all the image files of the target contents via the Web server according to the absolute URLs, and saving the image files in the local image file path of a local server;

replacing the absolute URLs of the image files of the local Web page with the local image file path;

extracting all the relative URLs of the source of the embedded links of the target contents of the local Web page and converting the relative URLs of the source of the embedded links to absolute URLs of the source of the embedded links;

saving the converted absolute URLs of the source of the embedded links in the database, creating an identifier for each the converted absolute URL, and saving all the identifiers in the database; and writing all the identifiers and the Java Server Pages (JSP) language into an embedded link local path in the local server of the source of the embedded links, and replacing the converted absolute URLs of the source of the embedded links with the embedded link local path.

5. The method as claimed in claim 4, further comprising the steps of:

determining whether contents of the URL in the replaced absolute URL of the source of the embedded links need to be downloaded;

saving the replaced target contents in the database if no contents need to be downloaded, or returning to the step of analyzing the contents of the local Web page to identify target contents by invoking the XQuery script document if any contents need to be downloaded.

6. An application server, comprising:

a writing module for extracting a Uniform Resource Locator (URL) of a HTML formatted Web page to be downloaded via a network, and writing the extracted URL to an XQuery script document;

an analyzing module for analyzing the XQuery script document to obtain the URL of the HTML Web page to be downloaded via a Web server connected to the network, saving the downloaded HTML Web page in a database as a local Web page, and for analyzing the contents of the local Web page to identify target contents by invoking the XQuery script document;

a converting module for extracting the relative URLs of all image files of the target contents of the local Web page and converting the relative URLs of all image files to absolute URLs of the image files, and for extracting all relative URLs of source of embedded links of the target contents of the local Web page and converting the relative URLs of source of the embedded links to absolute URLs of the source of the embedded links;

a downloading module for downloading all the image files of the target contents via the Web server according to the absolute URLs, and saving the image files in an local image file path of a local server electronically connected to the application server and the network;

a saving module for saving all the converted absolute URLs of the source of the embedded links in the database, creating an identifier for each the converted absolute URL, and saving all the identifiers in the database; and a replacing module for replacing the absolute URLs of the image files of the local Web page with the local image file path, and for writing all the identifiers and the Java Server Pages (JSP) language into an embedded link local path in the local server of the source of the embedded links, and replacing the converted absolute URLs of the source of the embedded links with the embedded link local path.

7. The application server as claimed in claim 6, wherein the application server further comprises:
a determining module for determining whether contents of the URL in the replaced absolute URLs of the source of the embedded links need to be downloaded.

8. The application server as claimed in claim 6, wherein the saving module is further programmed for saving the replaced target contents in the database.

* * * * *